Nov. 11, 1958  R. O. MAZE  2,859,626
APPARATUS FOR ADJUSTING THE STATIC BALANCE OF A
SENSITIVE INSTRUMENT ABOUT A ROTATIONAL AXIS
Filed Dec. 15, 1955

*INVENTOR.*
ROBERT O. MAZE
BY Roger W. Jensen

ATTORNEY

United States Patent Office 2,859,626
Patented Nov. 11, 1958

2,859,626

APPARATUS FOR ADJUSTING THE STATIC BALANCE OF A SENSITIVE INSTRUMENT ABOUT A ROTATIONAL AXIS

Robert O. Maze, St. Paul, Minn., assignor to Minneapolis-Honeywell Regulator Company, Minneapolis, Minn., a corporation of Delaware Application December 15, 1955, Serial No. 553,340

10 Claims. (Cl. 74—5.7)

This invention pertains generally to apparatus for adjusting the static balance of a sensitive instrument about a rotational axis. The invention has application to many sensitive instruments and has special utility in serving to balance a sensitive instrument that is normally inaccessible such as a device that is hermetically sealed such as a floated gyroscope. Another application for the present invention would be on devices rendered inaccessible due to their proximity to radioactive materials and the like.

The present invention is disclosed as being applied to a floated gyroscope but, as indicated above, certain aspects of the invention are not limited thereto.

An object of this invention is to provide a new and improved method and apparatus for adjusting the static balance of a sensitive instrument about a rotational axis.

Another object of the invention is to provide a method and apparatus for adjusting the static balance of a sensitive instrument wherein the balancing procedure may be done with the instrument remotely located from the one doing the balancing.

A further object of the invention is to provide as a means of balancing a sensitive instrument about a rotational axis a device comprising an enclosure or container, a thermoplastic material in said container, means in said container of different density than the density of said material, and means for heating said container for temporarily rendering said material fluid so as to allow relative motion between said means in said container and said container.

Another object of the invention is to utilize in apparatus for adjusting the static balance of a gimbal in a floated gyroscope the electrical connections between the gimbal and the housing of the floated gyroscope used to energize the spin motor windings of the gyroscope in such a way that the normal operation of the gyroscope is unimpaired, this arrangement eliminating the need for separate connections between the housing and the gimbal of the gyroscope for balancing purposes only.

Other and more specific objects of the invention, including constructional details of apparatus for balancing a sensitive element about a rotational axis embodying my invention, will be set forth more fully in and become apparent from a reading of the following specification and appended claims, in conjunction with the accompanying drawing in which:

Figure 1:
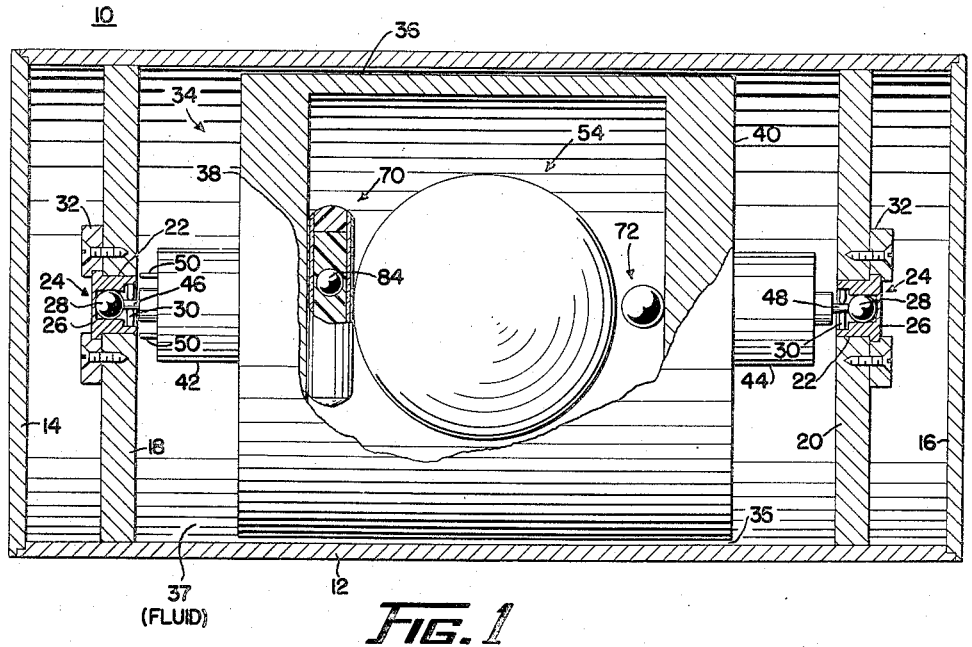
Figure 1 shows a cross-sectional view of a floated gyroscope comprising in part my improved gimbal balancing apparatus.

Referring to Figure 1 numeral 10 designates a sensitive instrument in the form of a floated gyroscope somewhat schematically shown and comprising a housing member 12 of hollow cylindrical construction and a pair of end members 14 and 16 fitted into suitable recesses in opposite ends of housing 12 and held thereto by suitable means, not shown. A pair of bearing support members 18 and 20 are positioned within housing 12 adjacent to end members 14 and 16 respectively. Each of members 18 and 20 has a central aperture 22 therein through which extends a bearing structure 24 comprising a bearing cup 26, a spherical bearing 28 within bearing cup 26, and a jewel bearing 30 also mounted within bearing cup 26. Each bearing cup 26 is securely held in position with respect to bearing support members 18 and 20 by a flanged retainer member 32 fastened by suitable means such as screws to bearing support members 18 and 20.

A gimbal assembly 34 is positioned within housing 12 between bearing support members 18 and 20. Gimbal assembly 34 comprises in part a hollow cylindrical member 36 closed off at each end by end portions 38 and 40 which have centrally located extensions 42 and 44 respectively which include in part shaft members 46 and 48 which are adapted to fit within the jewel bearings 30 and abut against the spherical bearings 28 in the bearing assemblies 24 in bearing support members 18 and 20 respectively. A plurality of connection pin members 50 are embedded in the extension 42 and insulated therefrom, pins 50 serving the purpose of providing an electrical connection between the gyro spin motor windings, to be described below, and external power supply means not shown, through flexible lead means 52, shown schematically on Figure 5. Connection pins 50 and 50' as well as flexible leads 52 may well be of the type shown and described in the copending application of Charles R. Bonnell, filed June 6, 1955, Serial Number 513,183.

An annular gap 35 is defined between the outer cylindrical surface of member 36 of gimbal assembly 34 and the inner cylindrical surface of housing 12. A suitable damping fluid 37 is disposed within housing 12, filling all void spaces between gimbal assembly 34 and housing 12 including gap 35. As is clearly understood by those skilled in the floated gyro art, the fluid 37 is selected for certain viscosity and density characteristics so that it will float or buoy up gimbal assembly 34 in substantially neutral suspension thus placing a minimum loading on jewel bearing 30. Further, the fluid 37 in gap 35 will tend to damp relative rotation of housing 12 and gimbal assembly 34. The absence of loading on bearings 30 permits them to be of a very delicate and frictionless design so as to produce a high accuracy gyro.

Figure 5:
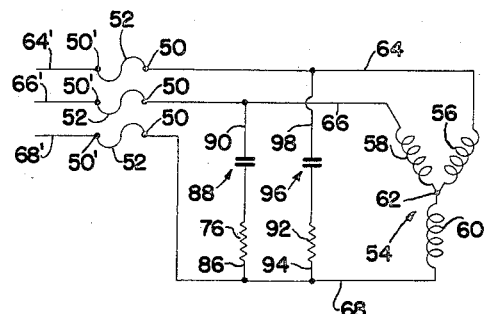
Figure 5 is an electrical schematic diagram of the floated gyroscope shown in Figure 1 with the improved gimbal balancing apparatus.

A gyro spin motor assembly 54 is mounted by suitable means not shown within gimbal assembly 34 and comprises in part a plurality of spin motor windings 56, 58, and 60, shown schematically in Figure 5. Windings 56, 58, and 60 are connected together at a common point 62 and their other extremities are connected through suitable connection leads 64, 66, and 68 respectively to terminal connection pins 50 and thence through flex leads 52 to additional connection pins 50' and thence through additional connection means 64', 66', and 68' to a suitable source of electrical power, not shown, such as a three-phase, four hundred cycle alternating current supply.

A pair of containers or capsules 70 and 72 are also positioned within gimbal assembly 34 and are fixed to the side walls 38 and 40 thereof respectively. In general, containers 70 and 72 are identical to one another with the exception of their mounting and hence in the detailed description thereof to follow, only capsule 70 will be explained but it should be understood that the explanation applies equally as well to capsule or container 72. It will be noted that containers 70 and 72 have a general tube-like configuration and are fixed to the side members 38 and 40 of gimbal assembly 34 so that the axes thereof are normal to one another. Thus in Figure 1 the container 70 is seen from its side whereas the container 72 is seen from its end. The reason for this particular type of mounting will be understood as the description proceeds.

Figure 2:
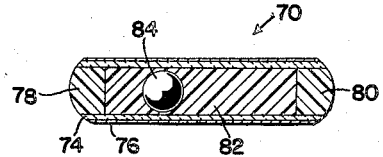
Figure 2 is a detailed view of one of the containers or capsules used in the balancing apparatus.

Referring now to Figure 2 for a more detailed drawing of container 70 it will be noted that container 70 comprises a cylindrical tube member 74 which may be made out of any suitable material such as a nonconductive glass or the like. A resistive winding or film 76 is wound or deposited on the outside of tube 74, resistive means 76 being adapted, when energized, to raise the temperature of its container 70 or 72. A pair of plug members 78 and 80 seal off the ends of tube 74, these plugs being made out of a suitable sealing material such as a polyester substance. A thermoplastic material 82 together with a ball-like member 84 are positioned inside the tube 74 of the container 70. Thermoplastic material 82 may be selected from any number of materials having thermoplastic characteristics suitable for the intended use. Examples of material 82 are Wood's metal, other eutectics, resin plastics, etc. Ball member 84 may be of any suitable material having a density different than the density of the thermoplastic material 82 and further, while only a single member 84 is shown, it should be understood that the teaching of the invention is broad enough to include having a plurality of such members or their equivalent within the inclosure.

One end of the resistive means 76 on the container 70 is connected by suitable connection means 86 to conductor 68 as shown in Figure 5. The other end of resistive means 76 is connected to one side of a suitable condenser 88 the other side of which is connected by a lead 90 to lead 66, leads 66 and 68 serving to energize the spin motor windings 58 and 60 of the spin motor 54. The resistive means associated with container 72 is identified by numeral 92, resistive means 92 being connected through a lead 94 to conductor 68 and the other end being connected to a condenser 96 the other side of which is connected through a lead 98 to lead 64.

The values of the condensers 88 and 96 are selected so that at the normal operating frequency of a spin motor 54, the capacitive reactance of the condensers 88 and 96 is so high that very little current will flow through the resistive means 76 and 92. However, during the balancing operation relatively high frequency currents are applied to the connection leads 64', 66', and 68', these frequencies being selected so that the capacitive reactance of condensers 88 and 96 thereto will permit relatively high currents to flow through resistive means 76 and 92 causing them to dissipate an appreciable amount of heat. Further, at the relatively high frequency selected for causing current to flow through resistors 76 and 92 the reactance of the spin motor windings 56, 58 and 60 is so high that very little current will flow through the windings during this operation.

Figure 3:
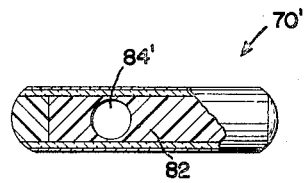
Figure 3 is an alternate construction of the container of capsule suitable for use in the balancing apparatus in place of the device shown in Figure 2.

An alternate construction is shown in Figure 3 where instead of a ball-like member 84, a bubble 84' is provided which may be of air or other suitable gas. The bubble 84' would have a much lower density than the thermoplastic substance 82 and hence when heat was applied to the thermoplastic substance 82 so as to cause it to flow the bubble 84' would be buoyed up by the thermoplastic substance 82, assuming that the tube assembly 70' was held with the axis of the tube in a vertical position.

Taking the case when member 84 in container 70 has a greater density than the thermoplastic material 82, assume that a gimbal unbalance is detected which would be alleviated if member 84 in container 70 were allowed to move downwardly as shown in Figure 1. The method of balancing then comprises the steps of moving the entire sensitive instrument 10 until the longitudinal axis of container 70 is horizontal; then applying for a given length of time a suitable high frequency alternating voltage across leads 66' and 68' thus causing a current to flow through resistive means 76 on the outer surface of container 70, the power dissipated in resistive means 76 raising the temperature of the container 70 and causing the thermoplastic material 82 to become fluid; then rotating instrument 10 and the position shown in Figure 1 for a given length of time; and then rotating instrument 10 back to its initial position (where container 70 was horizontal) and maintaining it there until the thermoplastic material 82 becomes solid once again. When the instrument is rotated to the position shown in Figure 1, the member 84 is moved downwardly relative to tube 74 of container 70 by the force of gravity, the movement being a function of the viscosity of the thermoplastic material 82 and the length of time that the container 70 is maintained in the position as shown in Figure 1. The viscosity of the thermoplastic material 82 in turn is a function of the power dissipated in the resistive means 76 due to the current flowing therethrough. Thus, by trial, the length of time the resistive means 76 is energized and the length of time that the container 70 is maintained in the position as shown in Figure 1 may be determined.

Figure 4:
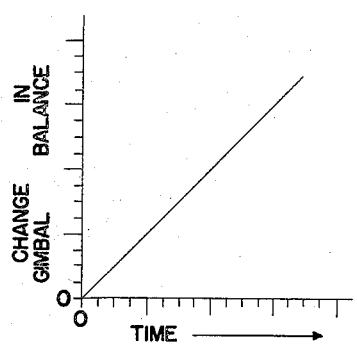
Figure 4 is a graph useable in the process of adjusting the static balance of a sensitive instrument about a rotational axis, the graph showing the relationship between the time interval allowed for change of balance and the resulting change of balance of the sensitive instrument.

A graph or chart similar to the one shown on Figure 4 may be used in the balancing operation for determining the length of time needed to maintain the container 70 in the position as shown in Figure 1. Thus, for a constant viscosity of the thermoplastic material 82 (obtained by controlling the heat dissipated in resistive means 76), the change in gimbal balance is a function of the length of time that the container 70 is maintained in the position as shown in Figure 1. The abscissa and ordinate of the graph shown in Figure 4 therefore indicate respectively balance change and length of time the container 70 is maintained in the position as shown in Figure 1.

If it is determined that additional unbalance remains after the first operation then the procedure may be repeated and by a process of continuing to reduce the amount of unbalance by a high percentage of the total error, a resultant gimbal unbalance of very small magnitude may be achieved.

It will be understood that in order to fully correct any gimbal unbalance it is necessary to have a pair of gimbal balancing devices, mounted at right angles to one another. Hence container 72 has been mounted on gimbal assembly 34 at right angles to the container 70. For a gimbal unbalance requiring the use of container 72, it follows that a high frequency current would be applied to leads 64' and 68' thus causing current to flow through resistive means 92 associated with container 72.

The balancing procedure used when a container of the type shown in Figure 3 is employed is generally the same as that for the container of Figure 2 except that since the density of the bubble or member 84' is less than the density of the thermoplastic material 82, the bubble or member 84' will move in the reverse sense than the member 84 having a density greater than the density of the thermoplastic material 82.

While I have shown and described a specific embodiment of this invention, further modifications and improvements will occur to the skilled in the art. I desire to be understood therefore, that this invention is not limited to the particular form shown in and I intend in the appended claims to cover all modifications which do not depart from the spirit and scope of this invention.

What I claim is:

1. Apparatus of the class described comprising a gyroscope; a gimbal supporting said gyroscope for rotation about an axis; and means for adjusting the static balance of said gimbal about said axis comprising a container mounted on said gimbal, a thermoplastic material in said container, an object in said container of different density than the density of said material, and means for heating said container so as to render said material fluid and so as to allow relative motion between said object and said container.

2. Apparatus of the class described comprising a gyroscope; a gimbal supporting said gyroscope for rotation about an axis; and means for adjusting the static balance of said gimbal about said axis comprising a container mounted on said gimbal, a thermoplastic material in said container, means in said container of different density than the density of said material, and means for temporarily rendering said material fluid so as to allow relative motion between said means in said container and said container.

3. Apparatus of the class described comprising a sensitive instrument, said instrument having a moving element supported for rotation about an axis; and means for adjusting the static balance of said moving element about said axis comprising a container mounted on said element, a thermoplastic material in said container, an object in said container of different density than the density of said material, and means for heating said container so as to render said material fluid and so as to allow relative motion between said object and said container.

4. Apparatus of the class described comprising a sensitive instrument, said instrument having a movable element supported for rotation about an axis; and means for adjusting the static balance of said movable element about said axis comprising a container mounted on said movable element, a thermoplastic material in said container, means in said container of different density than the density of said material, and means for heating said container for temporarily rendering said material fluid so as to allow relative motion between said means in said container and said container, said heating means including resistive means on said container.

5. Apparatus of the class described comprising a sensitive instrument, said instrument having a movable element supported for rotation about an axis; and means for adjusting the static balance of said movable element about said axis comprising a container mounted on said movable element, a normally solid material in said container, means in said container of different density than the density of said material, and means for temporarily rendering said material fluid so as to allow relative motion between said means in said container and said container.

6. Apparatus of the class described comprising: a floated gyroscope including a hermetically sealed housing, a gimbal supported in said housing for rotation about an output axis, a spin motor supported on said gimbal for rotation about a spin axis and including windings, and electrical connection means between said housing and said gimbal for energization of said spin motor windings; and means for adjusting the static balance of said gimbal about said gimbal axis comprising a container on said gimbal, a thermoplastic material in said container, means in said container of a different density than the density of said material, resistive means adjacent to said container which when energized serve to heat said container and melt said material, capacitor means, and means connecting said resistive means and said capacitor means to said electrical connection means.

7. Apparatus of the class described comprising: a sensitive instrument including a hermetically sealed housing, a member supported in said housing for rotation about an axis, an element supported on said member and including electrically energizable means, and electrical connection means between said housing and said electrically energizable means; and means for adjusting the static balance of said member about said axis comprising a container on said member, a thermoplastic material in said container, means in said container of a different density than the density of said material, resistive means adjacent to said container which when energized serve to heat said container and melt said material, capacitor means, and means connecting said resistive means and said capacitor means to said electrical connection means.

8. Apparatus of the class described comprising a floated gyroscope having a spin motor mounted on a gimbal and said gimbal supported for rotation about an axis; connection means for energizing said spin motor; and means for adjusting the static balance of said gimbal about said axis comprising a container fixed at said gimbal, a thermoplastic material in said container, means in said container of a different density than the density of said material, and means for heating said container for temporarily rendering said material fluid so as to allow relative motion between said means in said container and said container, said heating means including resistive means on said container connected to said connection means for energizing said spin motor.

9. In a sensitive control instrument having a movable element supported for rotation about an axis; and means for adjusting the static balance of said movable element about said axis comprising a container mounted on said movable element, a thermoplastic material in said container, means in said container of a different density than the density of said material, and means for heating said container for temporarily rendering said material fluid so as to allow relative motion between said means in said container and said container; a method of balancing said element about said axis comprising the steps of determining the amount of unbalance of said element, applying heat to said container while said container is in a horizontal position, and moving said container to a vertical position so that said means in said container may move relative to said container, the length of time said container being in a vertical position being proportional to the amount of unbalance.

10. Apparatus of the class described comprising a sensitive instrument, said instrument having a movable element supported for rotation about an axis; and means for adjusting the static balance of said movable element about said axis comprising a pair of generally elongated containers mounted on said movable element, each of said containers having a longitudinal axis and said containers being mounted on said movable element with the longitudinal axis of one of said containers being at an angle with the longitudinal axis of the other container, thermoplastic means in each of said containers normally fixed with respect to its container, and thermal means for selectively and temporarily releasing said thermoplastic means in each of said containers so as to permit relative motion between the thermoplastic means in each of said containers and its container, the static balance of said movable element being adjusted by first adjusting said thermoplastic means in one of said containers and then adjusting said thermoplastic means in the other of said containers.

References Cited in the file of this patent

UNITED STATES PATENTS

| | | |
|---|---|---|
| 1,209,730 | Leblanc | Dec. 26, 1916 |
| 1,833,879 | Ash | Nov. 24, 1931 |
| 1,903,817 | Johnson | Apr. 18, 1933 |
| 2,182,394 | Bucy | Dec. 5, 1939 |
| 2,384,838 | Kellogg | Sept. 18, 1945 |
| 2,426,400 | Lampton et al. | Aug. 26, 1947 |
| 2,438,213 | Hamilton | Mar. 23, 1948 |
| 2,464,516 | Kenyon | Mar. 15, 1949 |
| 2,571,727 | Konet | Oct. 16, 1951 |
| 2,711,652 | Anderson | June 28, 1955 |
| 2,722,848 | Stein | Nov. 8, 1955 |